(12) United States Patent
Spera

(10) Patent No.: US 9,682,431 B2
(45) Date of Patent: Jun. 20, 2017

(54) HOLE-SAW

(71) Applicant: Thomas J. Spera, Raleigh, NC (US)

(72) Inventor: Thomas J. Spera, Raleigh, NC (US)

( * ) Notice: Subject to any disclaimer, the term of this patent is extended or adjusted under 35 U.S.C. 154(b) by 0 days.

(21) Appl. No.: 14/734,365

(22) Filed: Jun. 9, 2015

(65) Prior Publication Data
US 2015/0352645 A1 Dec. 10, 2015

Related U.S. Application Data

(60) Provisional application No. 62/010,278, filed on Jun. 10, 2014.

(51) Int. Cl.
B23B 51/04 (2006.01)

(52) U.S. Cl.
CPC ...... B23B 51/0473 (2013.01); B23B 51/0426 (2013.01); B23B 2251/247 (2013.01); B23B 2251/70 (2013.01); Y10T 408/895 (2015.01); Y10T 408/8967 (2015.01)

(58) Field of Classification Search
CPC ............ B23B 51/0473; B23B 51/0406; B23B 51/0426; B23B 2251/428; B23B 2251/603; B23B 2251/606; Y10T 408/895
See application file for complete search history.

(56) References Cited

U.S. PATENT DOCUMENTS

| | | | | |
|---|---|---|---|---|
| 756,377 A | * | 4/1904 | Kimber | B23B 31/202 279/32 |
| 2,313,763 A | * | 3/1943 | Olsen | E01B 11/38 411/223 |
| 3,360,025 A | * | 12/1967 | Gallo, Sr. | B23B 51/0426 408/204 |
| 3,973,862 A | * | 8/1976 | Segal | B23B 31/113 144/23 |
| 4,072,441 A | * | 2/1978 | LaPointe | B23B 51/0426 144/23 |

(Continued)

FOREIGN PATENT DOCUMENTS

| | | | | |
|---|---|---|---|---|
| GB | 2293995 A | * | 4/1996 | B23B 51/0406 |
| JP | 08281635 A | * | 10/1996 | |

OTHER PUBLICATIONS

Machine translation, Japan patent document, JP08281635, "Boring Tool", inventor, Ikeda,N., Oct. 29, 1996.*

Primary Examiner — Daniel Howell
Assistant Examiner — Chwen-Wei Su
(74) Attorney, Agent, or Firm — Patent Law Offices of Rick Martin, P.C.

(57) ABSTRACT

A hole-saw comprises a cylindrical body, a plate, a mandrel, and a clamping member. A cutting edge is formed at an open end of the body and is disposed about the body's rotational axis. The plate is disposed at an opposite end of the body, is rotationally coupled to the body, and is oriented perpendicular to the body's rotational axis. The plate has lateral slots formed through the plate and lateral grooves formed in the plate's distal surface in an orientation transverse to the slots. The mandrel's proximal section forms an arbor shaft, and its distal section includes lateral bosses sized to insert through the plate's slots and rest in the plate's grooves. The clamping member has a body that is movable along the mandrel's longitudinal axis to engage the plate's proximal surface and clamp the plate between the clamping member and the bosses resting in the plate's grooves.

19 Claims, 6 Drawing Sheets

(56) References Cited

U.S. PATENT DOCUMENTS

| | | | | |
|---|---|---|---|---|
| 4,422,811 A | * | 12/1983 | Ellison | B23B 51/0426 125/20 |
| 4,893,426 A | * | 1/1990 | Bixler | F16B 7/20 403/299 |
| 5,035,550 A | | 7/1991 | Ajimi | |
| 5,167,475 A | * | 12/1992 | Miyanaga | B23B 31/113 408/201 |
| 5,791,837 A | * | 8/1998 | Johnson | B23B 51/0453 408/204 |
| 5,813,802 A | * | 9/1998 | Ajimi | B23B 51/0426 175/403 |
| 7,001,119 B2 | * | 2/2006 | Wendzina | B23B 51/0426 408/204 |
| 8,573,907 B2 | * | 11/2013 | Kalomeris | B23B 51/0406 408/204 |
| 2002/0122703 A1 | * | 9/2002 | Czyzewski | B23B 31/113 408/1 R |

* cited by examiner (Detail B)

(Detail D)

(Section A-A)

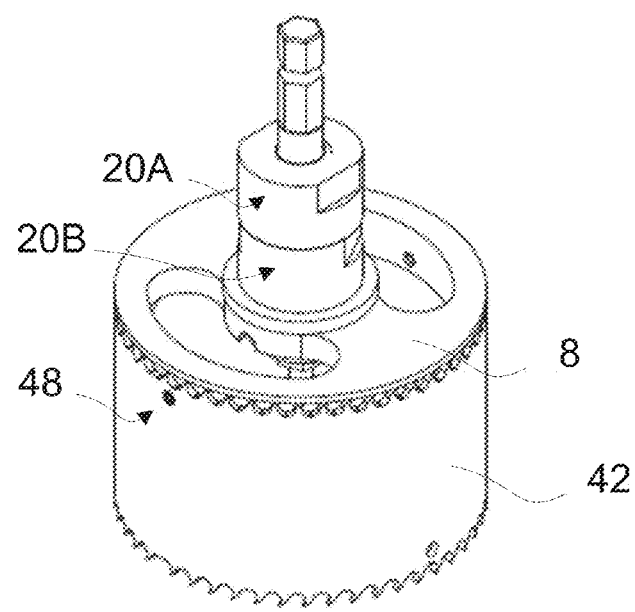
Figure 7A
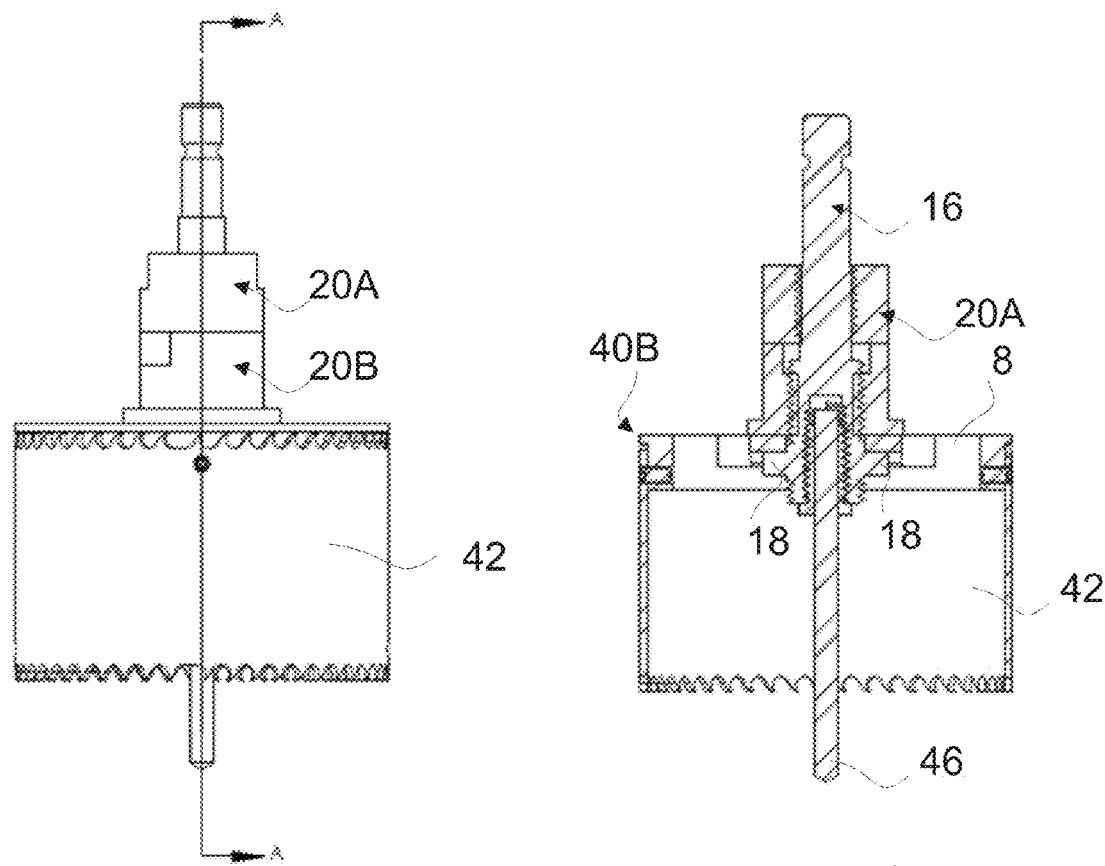
Figure 7B
Figure 7C
(Section A-A)

HOLE-SAW

RELATED APPLICATIONS

This application claims priority from U.S. Provisional Patent App. No. 62/010,278 filed 10 Jun. 2014, which is incorporated herein by reference in its entirety.

BACKGROUND

The most common type of hole-saw on the market today is made up of two components, the mandrel and the hole-saw cup. The mandrel has a threaded portion onto which the hole-saw cup is screwed to, and then is locked in place with two sliding pins. These pins are attached to the mandrel and slip into two receiving holes on the upper surface of the hole-saw cup. This type of hole-saw suffers from wobbling between the parts. Moreover, it is only designed as a single edged cutter; when it gets dull, it is thrown away.

SUMMARY

A hole-saw according to one or more embodiments herein comprises a cylindrical body, a plate, a mandrel, and a clamping member.

The body has a first cutting edge formed at a first end of the body that is open. The first cutting edge is disposed about a rotational axis of the body. The plate is disposed at a second end of the body, is rotationally coupled to the body, and is oriented perpendicular to the body's rotational axis. The plate has lateral slots formed through the plate and lateral grooves formed in a distal surface of the plate in an orientation transverse to the slots. The mandrel includes a proximal section forming an arbor shaft, and a distal section including lateral bosses sized to insert through the plate's slots and rest in the plate's grooves. The clamping member has a body that is movable along the mandrel's longitudinal axis to engage a proximal surface of the plate and clamp the plate between the clamping member and the bosses resting in the plate's grooves, so as to rotationally couple the body, plate, and mandrel.

In at least some embodiments, rotationally coupling the body, plate, and mandrel in this way proves advantageous in that it eliminates or at least reduces wobbling between the body, plate, and/or mandrel (as compared to existing hole-saws).

In one or more embodiments, the plate has a single pair of said slots extending laterally in opposite directions from a circular hole through the center of the plate. The plate has a single pair of said grooves extending laterally in opposite directions from said circular hole and in an orientation transverse to said slots, and the mandrel's distal section includes a single pair of said bosses.

Alternatively or additionally, the clamping member comprises at least one nut configured to screw along outer threads of a center section of the mandrel to engage the plate's proximal surface.

In at least some embodiments, a center section between the mandrel's proximal and distal sections has two different threaded portions that include outer threads with different handedness. In this case, the clamping member comprises different nuts configured to screw along respective ones of the threaded portions to engage the plate's proximal surface.

In one or more embodiments, the plate includes one or more additional slots formed through the plate that at least partially circumscribe the lateral slots.

Alternatively or additionally, the mandrel has a threaded hole at an end of the mandrel's distal section, the threaded hole sized and configured to receive a threaded collet that holds a pilot bit.

In some embodiments, the mandrel is configured to interchangeably and rotationally couple to a different plate. In this case, the mandrel's distal section further includes outer threads disposed opposite the bosses from the mandrel's proximal section, the outer threads configured to screw into inner threads of the different plate.

Alternatively or additionally, the plate has a rabbeted edge around its outer circumference formed as a lip extending laterally from an outer wall of the plate. In such a case, the cylindrical body's second end engages an underside of the lip, and the cylindrical body's inner surface engages the plate's outer wall.

In one or more embodiments, the cylindrical body's second end is also open. In one such embodiment, the cylindrical body additionally has a second cutting edge formed at the body's second end. The second cutting edge is disposed about the cylindrical body's rotational axis, and the plate is configured to interchangeably couple to the cylindrical body at the body's first and second ends.

In at least some embodiments, the cylindrical body is hollow throughout its entire length. In one such embodiment, the plate has a rabbeted edge around its outer circumference.

One or more embodiments herein further include a hole-saw assembly configured to couple to a cylindrical body with a cutting edge. The assembly comprises a plate and a mandrel. The plate has a circular hole through its center, slots through the plate that extend outward from the hole, and grooves in a distal surface of the plate that extend outward from the hole in an orientation transverse to the slots. The mandrel includes an arbor shaft, bosses configured to insert through the plate's slots and rest in the plate's grooves, and a threaded section between the arbor shaft and the bosses. The threaded section is configured to receive at least one nut for screwing along the threaded section to engage a proximal surface of the plate.

In one or more embodiments, the plate has a single pair of said slots extending laterally in opposite directions from the plate's circular hole. The plate has a single pair of said grooves extending laterally in opposite directions from said circular hole, and said bosses comprise a single pair of bosses.

In some embodiments, the threaded section has two different threaded portions that include outer threads with different handedness.

In at least one embodiments, the plate includes one or more additional slots formed through the plate and extending around at least half of the plate's circumference.

Alternatively or additionally, the mandrel has a threaded hole at an end opposite the arbor shaft, the threaded hole configured to receive a threaded collet that holds a pilot bit. In one such embodiment, the plate has a rabbeted edge around its outer circumference.

Embodiments herein also include a double-edge hole-saw cup. The cup comprises a cylindrical body with a first cutting edge formed at a first open end of the body and a second cutting edge formed at a second open end of the body. The first and second cutting edges are disposed about a rotational axis of the body. The cylindrical body is hollow through its entire length. The cup also includes a plate configured to interchangeably couple to the first and second ends of the body in an orientation perpendicular to the body's rotational axis.

In one embodiment, the plate has lateral slots formed through the plate and lateral grooves formed in a surface of the plate in an orientation transverse to the slots.

Alternatively or additionally, the plate has a rabbeted edge around its outer circumference for receiving the cylindrical body.

In some embodiments, the plate is configured to couple to at least one of the first and second ends of the body via set screws or push pins that insert into or through a sidewall of the body.

One or more embodiments herein thereby include a hole-saw that substantially eliminates (e.g., by about 99%) the wobbling that is common with other hole-saws on the market, yielding a faster, cleaner and more precise cut. Alternatively or additionally, embodiments herein include a hole-saw that uses a double-edged cutter, yielding twice the cut from each saw. A hole-saw according to at least some embodiments only uses about 30% of the metal to produce (compared to existing hole-saws), meaning that it is more economical to produce and saves a lot of raw materials. As yet another additional or alternative feature, the pilot bit is secured to the mandrel using a locking collet, making the pilot bit easier to replace and making the hole-saw able to use standard drill bits. These changes, especially when combined, make the tool more accurate, faster, and safer to use, all at a fraction of the cost of the standard hole-saws.

According to some embodiments, a hole-saw herein advantageously avoids cutting your hand if you were to try to slow down the drill with your hand. As compared to existing hole-saws, the mandrel according to one or more embodiments is simpler and less expensive to produce. Additionally or alternatively, the hole-saw herein uses less metal to produce, meaning that it costs less to manufacture. In at least some embodiments, the mandrel herein avoids other problems that plague existing hole-saws, including the problem that a mandrel has heretofore only been good for a certain range of sizes until you need the next size mandrel (costing more to purchase).

BRIEF DESCRIPTION OF THE DRAWINGS

FIG. 7A is a perspective view of a hole-saw according to one or more embodiments.

FIG. 7B is a side view of the hole-saw in FIG. 7A according to one or more embodiments.

FIG. 7C is a cross-sectional view of the hole-saw in FIG. 7B.

DETAILED DESCRIPTION

Figures 1A, 1B:
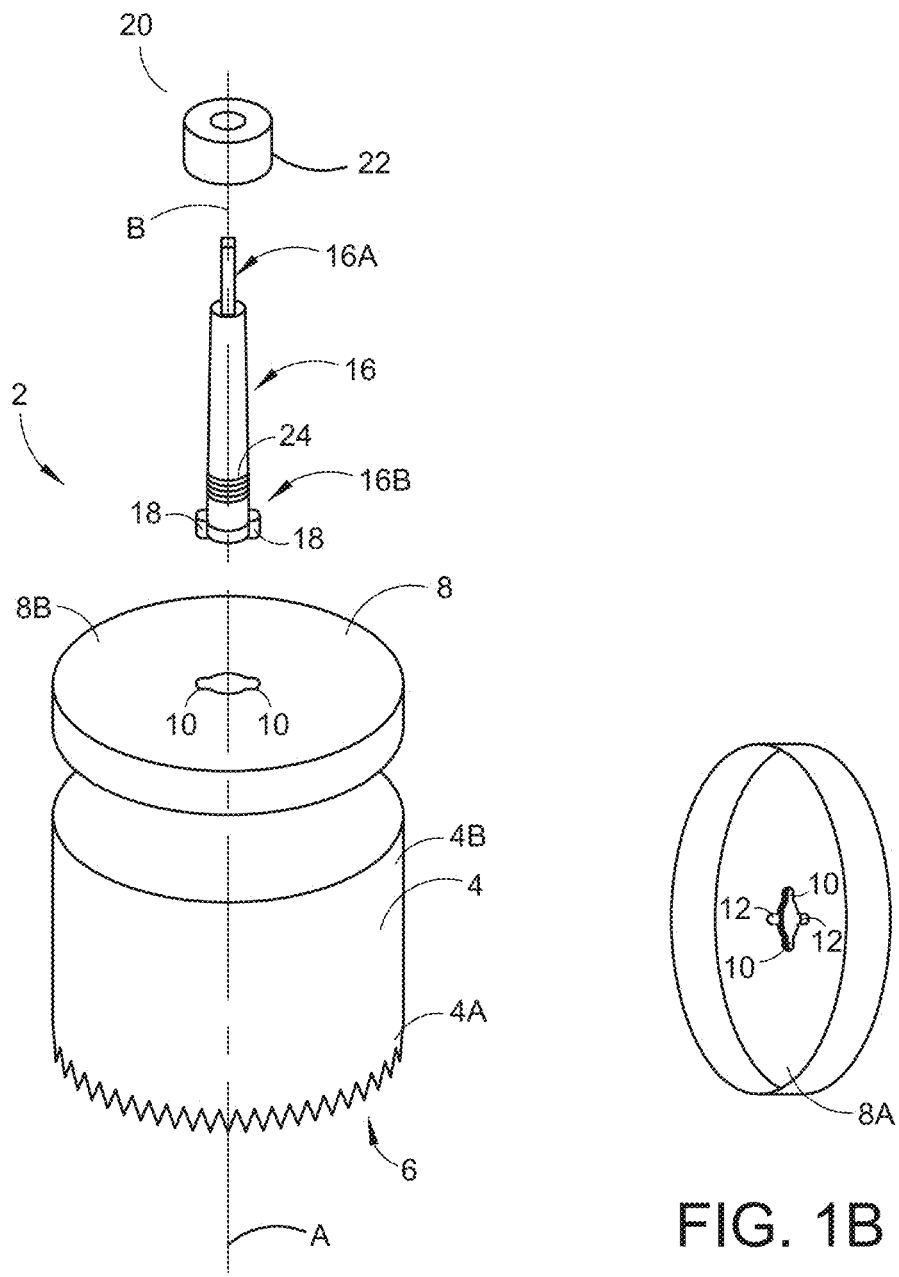
FIG. 1A is a perspective view of a hole-saw according to one or more embodiments.
FIG. 1B is a perspective view of the hole-saw plate in FIG. 1A.

FIGS. 1A-1B illustrate a hole-saw 2 according to one or more embodiments. The hole-saw 2 includes a cylindrical body 4, a plate 8, and a mandrel 16.

The body 4 has a first cutting edge 6 formed at a first end 4A of the body 4 that is open. This first cutting edge 6 is disposed about a rotational axis A of the body.

The plate 8 is disposed at a second end 4B of the body 4 different than the first end 4A. Although illustrated as separate from the body 4 in FIGS. 1A-1B for explanatory purposes, the plate 8 is rotationally coupled to the body 4 such that rotation of the plate 8 or the body 4 results in rotation of the other. The plate 4 is oriented perpendicular to the body's rotational axis A, as shown.

Notably, the plate 8 has lateral slots 10 formed through the plate 8. As shown in FIGS. 1A-1B, for example, the plate 8 has a single pair of lateral slots 10 that extend laterally, e.g., in opposite directions, from a circular hole through the plate's center. The plate 8 in alternative embodiments, though, has any number of lateral slots 10 more than one.

The plate 8 also has lateral grooves 12 formed in a distal surface 8A (i.e., underside) of the plate 8. The grooves 12 or channels are formed in this surface 8A, rather than extending through the plate 8 like the slots 10. For example, the plate 8 in one or more embodiments has a defined thickness, and the slots 10 extend all the way through that thickness whereas the grooves 12 extend only partially through the plate's thickness. Regardless, the grooves 12 are formed in an orientation transverse to the slots 10. In the embodiment shown in FIGS. 1A-1B, there are two slots 10 and two grooves 12, and the grooves 12 are formed in an orientation perpendicular to the slots 10.

The hole-saw 2 also includes a mandrel 16. The mandrel 16 has a proximal section 16A and a distal section 16B. The proximal section 16A forms an arbor shaft, e.g., for attaching to a drill chuck. The distal section 16B includes lateral bosses 18 that are sized to insert through the plate's slots 10 and rest in the plate's grooves 12.

In practice, for example, the mandrel 16 is moved in the direction of the body's rotational axis A towards the plate 8. With the bosses 18 aligned with the plate's slots 10, the mandrel's distal section 16B and bosses 18 insert through the slots 10. The mandrel 16 is then rotated or twisted about its longitudinal axis B until the bosses 18 align with the plate's inner grooves 12 formed in the plate's distal surface 8A. The mandrel 16 is then moved backward relative to the body along the body's rotational axis A such that the bosses 18 engage and rest in the plate's grooves 12.

In any event, the hole-saw further includes a clamping member 20 for clamping the plate 8 between the clamping member 20 and the bosses 18 resting in the plate's grooves 12. The clamping member 20 in this regard has a body 22 that is movable along the mandrel's longitudinal axis B to engage a proximal surface 8B of the plate 8. In one embodiment, for example, the clamping member 22 comprises at least one nut configured to screw along outer threads 24 of a center section of the mandrel to engage the plate's proximal surface 8B. With the bosses 18 resting in the plate's grooves, the clamping member's engagement with the plate's proximal surface 8B clamps the plate 8 between the clamping member 20 and the bosses 18, so as to rotationally couple the body 4, plate 8, and mandrel 16 (e.g., in an end-to-end manner).

In at least some embodiments, rotationally coupling the body 4, plate 8, and mandrel 16 in this way proves advantageous in that it eliminates or at least reduces wobbling between the body 4, plate 8, and/or mandrel 16 (as compared to existing hole-saws).

In some embodiments, such as those in FIGS. 1A-1B, the plate 8 has a single pair of slots 10 extending laterally in opposite directions from a circular hole through the center of the plate 8. And the plate 8 has a single pair of grooves 12 extending laterally in opposite directions from the plate's circular hole and in an orientation transverse to the slots 10. And, finally, the mandrel's distal section 16B includes a single pair of bosses 18. In other embodiments, there may be more than two (e.g., 3 or 4) slots 10, grooves 12, and bosses 18. In at least one or more embodiments, though, there are an equal number of slots 10, grooves 12, and bosses 18.

Figure 2:
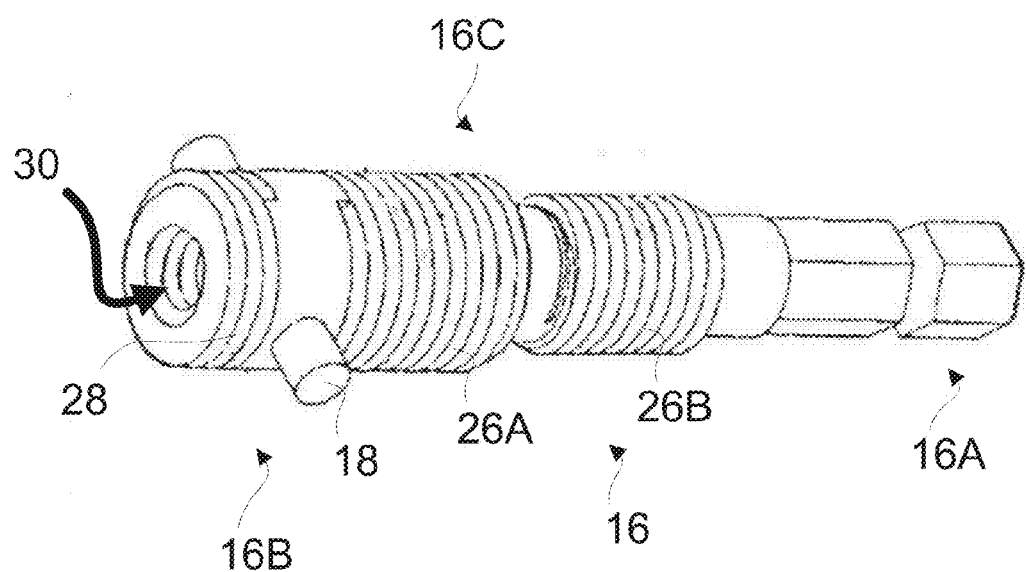
FIG. 2 is a perspective view of a mandrel according to one or more embodiments.

FIG. 2 illustrates the mandrel 16 according to one or more embodiments. As shown in FIG. 2, the mandrel has a center section 16C between the mandrels' proximal and distal sections 16A, 16B. This center section 16C has two different threaded portions 26A and 26B that include outer threads with different handedness (e.g., a standard thread with right-handedness and a reverse thread with left-handedness). Handedness in this regard refers to the direction that a thread's helix twists or rotates. In this case, the clamping member 20 includes different nuts configured to screw along respective ones of the threaded portions 26A, 26B to engage the plate's proximal surface 8B. Using multiple nuts in this way (e.g., as a double nut locking system) advantageously guards against loosening of the coupling between the plate 8, the mandrel 16, and the body 4. Although the threaded portions 26A and 26B are shown in FIG. 2 as being separated by a non-threaded portion, such need not be the case.

Alternatively or additionally, the mandrel 16 is configured to interchangeably and rotationally couple to a different plate (not shown). Specifically, the mandrel 16's distal section in this case also includes outer threads 28 disposed opposite the bosses 18 from the mandrel's proximal section 16A, as shown in FIG. 2. These outer threads 28 are configured to screw into inner threads of the different plate. The outer threads 28 thereby serve as an alternative to the bosses 18/clamping member 20, so that the mandrel 16 is capable of coupling to multiple different plates (e.g., including conventional plates) at different times.

Also alternatively or additionally, the mandrel 16 in some embodiments has a threaded hole 30 at an end of the mandrel's distal section 16B. This threaded hole 30 is sized and configured to receive a threaded (e.g., locking) collet that holds a pilot bit.

Figure 3:
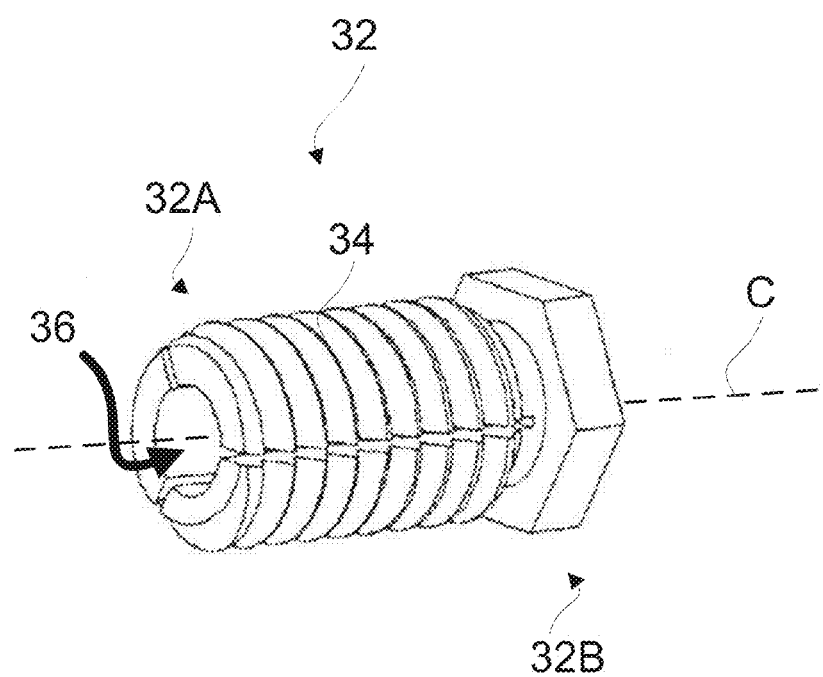
FIG. 3 is a perspective view of a threaded collet according to one or more embodiments.

FIG. 3 illustrates one example of such a threaded collet 32. As shown, the collet 32 has outer threads 34 formed at the collet's proximal end 32A. These outer threads 34 screw into inner threads of the threaded hole 30. The collet 32 also has a hole 36 formed through its center along the collet's longitudinal axis C for receiving a pilot bit (not shown). The pilot bit's non-drilling end may be, for example, inserted through the hole 36 at the collet's distal end 32B and along the collet's longitudinal axis so as to be clamped in place by a tapered outer collar.

Securing a pilot bit to the mandrel 16 using a collet in this way advantageously makes the pilot bit easier to replace and/or makes the hole-saw able to use standard drill bits. Indeed, unlike conventional hole-saws that require removal of the mandrel from the hole-saw cup in order to replace the pilot bit, or require a proprietary or non-replaceable bit, the mandrel 16 and collet herein allow the pilot bit to be replaced without having to uncouple the mandrel 16 from the plate 8 or body 4.

Figure 4A:
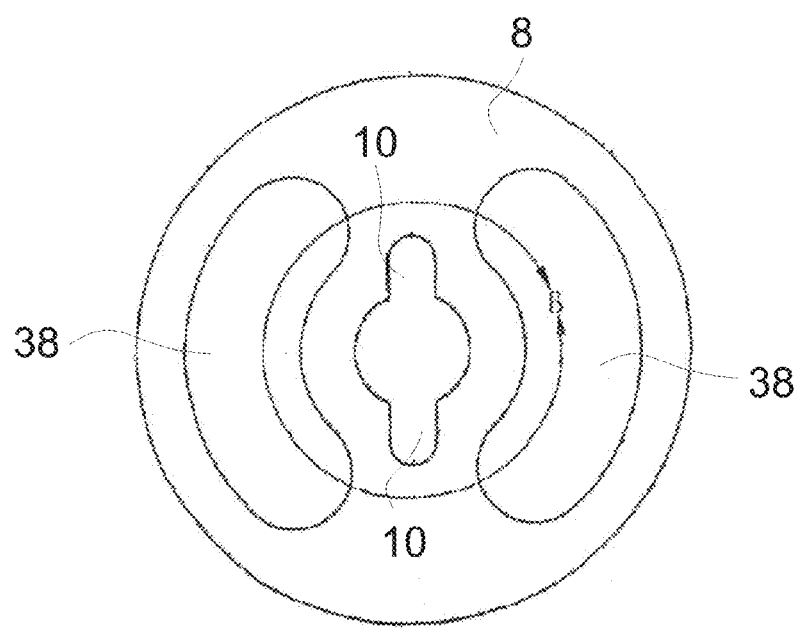
FIG. 4A is a top view of a plate according to one or more embodiments.
Figure 4B:
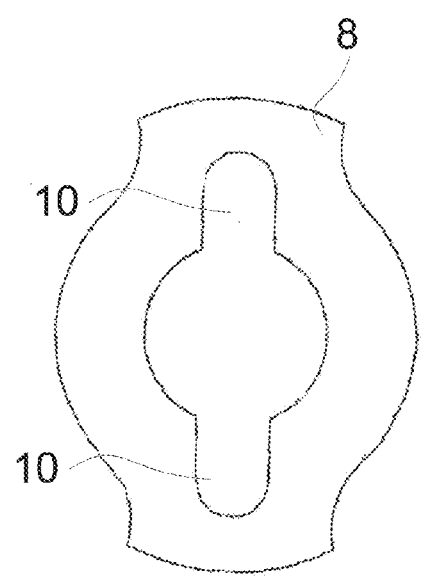
FIG. 4B is a detail view of the plate in FIG. 4A.
Figure 5A:
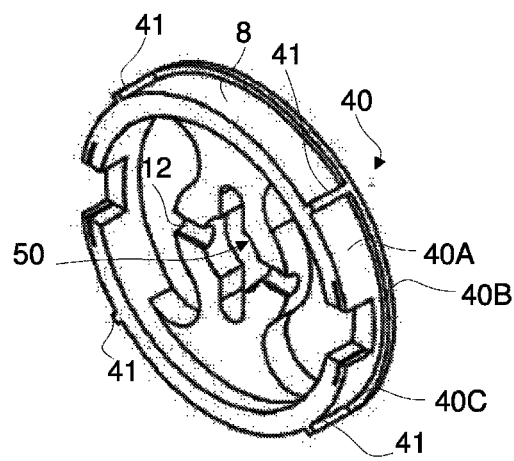
FIG. 5A is a perspective view of a plate according to one or more embodiments.
Figure 5B:
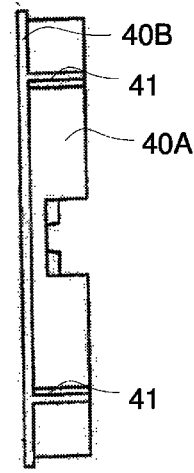
FIG. 5B is a side view of the plate in FIG. 5A according to one or more embodiments.
Figure 5C:
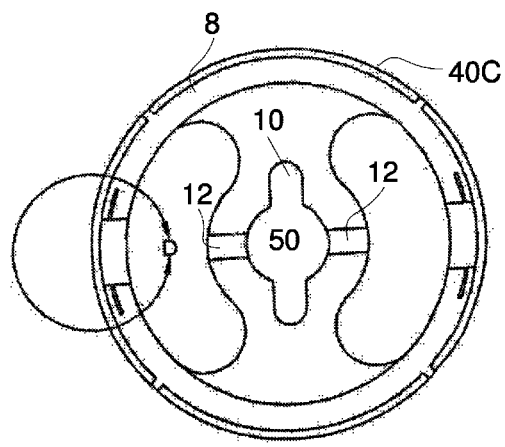
FIG. 5C is a bottom view of the plate in FIG. 5A according to one or more embodiments.
Figure 5D:
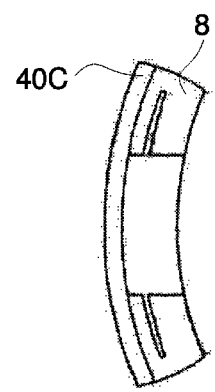
FIG. 5D is a detail view of the plate in FIG. 5C.

Although the plate 8 is shown in FIGS. 1A-1B as just having lateral slots 10, the plate 8 in some embodiments includes one or more additional slots formed through the plate 8 that at least partially circumscribe the lateral slots 10 (e.g., by at least halfway). The additional slot(s) may for instance reduce raw materials (e.g., by about 70%) and/or provide one or more escape outlets for saw dust. FIGS. 4A-4B illustrates one embodiment of the plate 8 in this regard.

As shown in FIGS. 4A-4B, the plate 8 has a pair of additional slots 38 that partially circumscribe the lateral slots 10. The additional slots 38 in this example are C-shaped slots disposed around an outer perimeter of the plate 8.

In one or more additional or alternative embodiments, the plate 8 has a rabbeted edge 40 around its outer circumference as shown in FIGS. 5A-5D (in the context of embodiments that include additional slots 38). The rabbeted edge 40 is a recess or groove cut into the edge of the plate. The rabbeted edge for example is formed as a lip 40B extending laterally outward from the plate's outer wall 40A. In this case, the cylindrical body's second end 4B engages an underside of the lip 40B, and the cylindrical body's inner surface (not shown) engages the plate's outer wall 40A. As shown, the plate 8 also includes a plurality of anti-rotational tabs 41 disposed around the plate's outer circumference. The tabs 41 each extend laterally outward beyond the plate's outer wall 40A. As described more fully below with respect to FIG. 6A-6C, the tabs 41 are configured to engage respective slots disposed around an open end of the cylindrical body when the plate is coupled to that end. The tabs 41 and slots engaging in this way prevents or mitigates rotation of the cylindrical body relative to the plate 8 around the body's rotational axis.

In at least some embodiments, the thickness of the cylindrical body 4 is approximately equal to the distance d that the lip 40B extends from the plate's outer wall 40A. This proves advantageous, for example, in creating an approximately flush transition between the plate 8 and the cylindrical body 4, so as to reduce the risk of cutting an operator's hand (e.g., upon the operator trying to slow down the drill with his or her hand).

In at least some embodiments, the cylindrical body 4 is integrally formed with or non-removably coupled to the plate 8. In other embodiments, though, the body 4 is removably coupled to the plate 8.

In some embodiments, for example, the cylindrical body's second end 4B is also open. In this case, the body 4 additionally has a second cutting edge formed at its second open end 4B and disposed about the body's rotational axis A. Furthermore, the plate 8 is configured to interchangeably couple to the cylindrical body 8 at the body's first and second ends 4A, 4B. The body 4 in this case operates as a double-edge cutter; when the first cutting edge becomes dull, the body 4 can be reversed and the body's second open end 4B coupled to the plate 8 so that the second cutting edge can be used.

Regardless, in at least some embodiments, the body 4 is hollow throughout its entire length. In one or more embodiments, this hollowness is made possible by the plate 8 removably attaching to the body's ends, as opposed to for example attaching to an internal disk within the middle of the body (such that the body would not be hollow throughout its entire length). With the body 4 hollow throughout its entire length, and with the plate 8 reversably coupling to the body's ends, the hole-saw enables a cut that is approximately as deep as the body 4 is long.

Figure 6A:
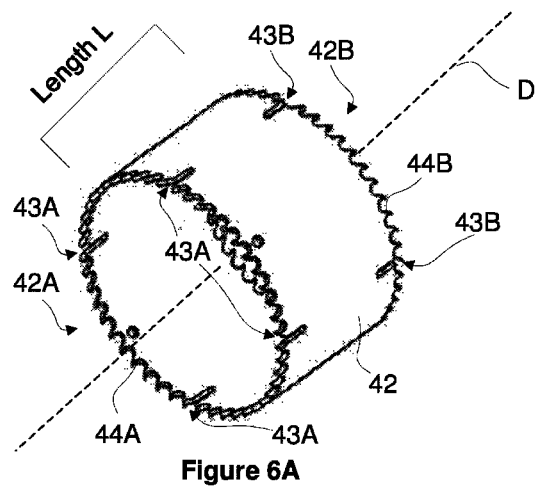
FIG. 6A is a perspective view of a hole-saw body according to one or more embodiments.
Figure 6B:
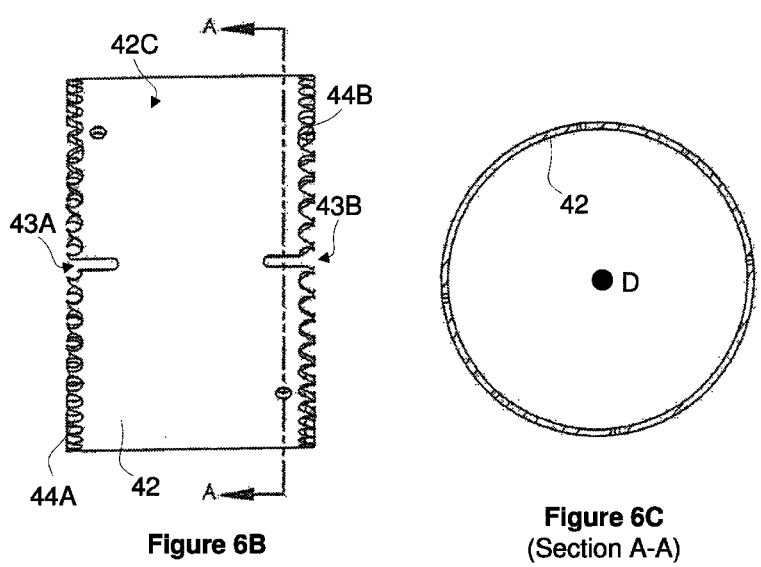
FIG. 6B is a side view of the hole-saw body in FIG. 6A according to one or more embodiments.
Figure 6C:
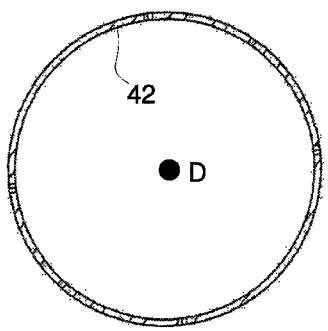
FIG. 6C is a cross-sectional view of the hole-saw body in FIG. 6B according to one or more embodiments.

One or more other embodiments herein thereby include a double-edge hole-saw cup. The cup comprises a cylindrical body 42 as shown in FIGS. 6A-6B. As shown, the body 42 has a first cutting edge 44A formed at a first open end 42A of the body 42 and a second cutting edge 44B formed at a second open end 42B of the body 42. The first and second cutting edges 44A, 44B are disposed about a rotational axis D of the body 42. Notably, the cylindrical body 42 is hollow through its entire length L. The cup further includes a plate configured to interchangeably couple to the first and second ends 42A, 42B of the body 42 in an orientation perpendicular to the body's rotational axis D. As shown, the body also has first slots 43A disposed around the first open end 42A of the body 42. The body 42 also has second slots 43B disposed around the second open end 42B of the body 42. As alluded to above, anti-rotational tabs 41 are configured to engage respective ones of the first slots 43A or the second slots 43B when the plate 8 is coupled to the first end 42A or the second end 42B, respectively.

In one or more embodiments, for example, the plate is configured to couple to at least one of the first and second ends 42A, 42B of the body 42 via set screws or push pins that insert into or through a sidewall 42C of the body.

The double-edge hole-saw cup as just described may be independent of or combined with other embodiments herein.

For example, FIGS. 7A-7C illustrate some embodiments herein of a hole-saw with a double-edge body, and the mandrel 16 and plate 8 described previously. These embodiments also illustrate the clamping member as consisting of a double nut locking system.

In one or more particular embodiments, the mandrel 16 consists of the arbor (a solid piece of steel that has a hexagonal shaft that gets inserted into the drill chuck), three outer threads (including an upper section 26B that is a ½" reverse thread, a center section 26A that is a ⅝" standard thread, and a lower section 28 that is a ⅝" standard thread). The mandrel 16 also has a threaded hole 30 through the bottom of it, two bosses 18 projecting outwardly at 180 degrees from each other, two locking nuts 20A and 20B, and a pilot bit 46 which gets locked into the threaded hole 30 with a locking collet 32.

The hole-saw cup in such embodiments consists of a top plate 8, the hole-saw body 42, and set screws 48. The top plate 8 has a ⅝" center hole 50 with elongated slots 10 and shallow grooves 12 at 90 degrees to the elongated slots 10. The plate 8 also has a rabbeted edge 40 around its outer circumference into which the hole-saw body 4 slides over and gets secured in place by backing out the set screws 48 from the top plate 8 and into the hole-saw body 4.

The mandrel 16 slides into the center hole 50 of the top plate 8 and the bosses 18 slide through the elongated slots 10, then get twisted 90 degrees and drop down into the shallow grooves 12. Then, the mandrel 16 gets locked in place with the two lock nuts 20A and 20B.

In at least some embodiments, each size saw has its own top plate. The top plate is re-usable one or more times (e.g., saving money and raw material).

In one or more embodiments, the hole-saw body 4 is a single piece of metal with teeth on both edges, giving two cutting edges on the same saw. According to some embodiments, these are replaceable but at a fraction of the cost, saving money and raw materials.

The shaft in some embodiments has both forward and reverse threads that secure the hole-saw to the mandrel and prevents it from loosening unintentionally.

The bosses 18 in one or more embodiments project outwardly from the shaft and lock into the top plate preventing it from falling off the mandrel.

The lower threaded portion in at least some embodiments is for attaching smaller hole-saws. This allows use of the same mandrel for any size hole-saw from ½" to 6".

The threaded hole in some embodiments is a receiving hole into which the locking collet is screwed in, which secures the pilot bit in place.

Finally, the locking collet in one or more embodiments allows for easy changing of standard pilot bits, which are cheaper and easier to find.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

The invention claimed is:

1. A hole-saw, comprising:
   a cylindrical body with a first cutting edge formed at a first end of the body that is open, the first cutting edge disposed about a rotational axis of the body, wherein the cylindrical body has first slots disposed around the first open end of the body;
   a plate disposed at a second end of the body, rotationally coupled to the body, and oriented perpendicular to the body's rotational axis, wherein the plate has lateral slots formed through the plate and lateral grooves formed in a distal surface of the plate in an orientation transverse to the slots, wherein the plate comprises a plurality of anti-rotational tabs that are disposed around the plate's outer circumference and that are configured to engage respective ones of the first slots when the plate is coupled to the first end of the cylindrical body, wherein each anti-rotational tab extends laterally outward beyond an outer wall of the plate;
   a mandrel that includes:
      a proximal section forming an arbor shaft; and
      a distal section including lateral bosses sized to insert through the plate's slots and rest in the plate's grooves; and
   a clamping member with a body that is movable along the mandrel's longitudinal axis to engage a proximal surface of the plate and clamp the plate between the clamping member and the bosses resting in the plate's grooves, so as to rotationally couple the body, plate, and mandrel.

2. The hole-saw of claim 1, wherein the plate has a single pair of said slots extending laterally in opposite directions from a circular hole through the center of the plate, wherein the plate has a single pair of said grooves extending laterally in opposite directions from said circular hole and in an orientation transverse to said slots, and wherein the mandrel's distal section includes a single pair of said bosses.

3. The hole-saw of claim 1, wherein the clamping member comprises at least one nut configured to screw along outer threads of a center section of the mandrel to engage the plate's proximal surface.

4. The hole-saw of claim 1, wherein a center section between the mandrel's proximal and distal sections has two different threaded portions that include outer threads with different handedness, and wherein the clamping member comprises different nuts configured to screw along respective ones of the threaded portions to engage the plate's proximal surface.

5. The hole-saw of claim 1, wherein the plate includes one or more additional slots formed through the plate that at least partially circumscribe the lateral slots.

6. The hole-saw of claim 1, wherein the mandrel has a threaded hole at an end of the mandrel's distal section, the threaded hole sized and configured to receive a threaded collet that holds a pilot bit.

7. The hole-saw of claim 1, wherein the mandrel is configured to interchangeably and rotationally couple to a different plate, wherein the mandrel's distal section further includes outer threads disposed opposite the bosses from the mandrel's proximal section, the outer threads configured to screw into inner threads of the different plate.

8. The hole-saw of claim 1, wherein the plate has a rabbeted edge around its outer circumference formed as a lip extending laterally from an outer wall of the plate, wherein the cylindrical body's second end engages an underside of the lip, and the cylindrical body's inner surface engages the plate's outer wall.

9. The hole-saw of claim 1, wherein the cylindrical body's second end is also open, wherein the cylindrical body additionally has a second cutting edge formed at the body's second end, the second cutting edge disposed about the cylindrical body's rotational axis, and wherein the plate is configured to interchangeably couple to the cylindrical body at the body's first and second ends, wherein the cylindrical body has second slots disposed around the second open end of the body, wherein the anti-rotational tabs are configured to engage respective ones of the second slots when the plate is coupled to the second end of the cylindrical body.

10. The hole-saw of claim 9, wherein the cylindrical body is hollow throughout its entire length.

11. The hole-saw of claim 9, wherein the plate has a rabbeted edge around its outer circumference.

12. The hole-saw of claim 1, wherein the plate comprises a lip that extends around the plate's outer circumference and that extends laterally outward from the plate's outer wall, wherein an underside of the lip is configured to engage the first end of the cylindrical body when the plate is coupled to the first end of the cylindrical body.

13. The hole-saw of claim 1, wherein the plate is configured to couple to the first end of the cylindrical body via set screws that insert into a sidewall of the cylindrical body.

14. The hole-saw of claim 1:
wherein a center section between the mandrel's proximal and distal sections has two different threaded portions that include outer threads with different handedness, and wherein the clamping member comprises different nuts configured to screw along respective ones of the threaded portions to engage the plate's proximal surface;
wherein the plate has a rabbeted edge around its outer circumference formed as a lip extending laterally from an outer wall of the plate, wherein the cylindrical body's second end engages an underside of the lip, and the cylindrical body's inner surface engages the plate's outer wall;
wherein the cylindrical body's second end is also open, wherein the cylindrical body additionally has a second cutting edge formed at the body's second end, the second cutting edge disposed about the cylindrical body's rotational axis, and wherein the plate is configured to interchangeably couple to the cylindrical body at the body's first and second ends, wherein the cylindrical body has second slots disposed around the second open end of the body, wherein the anti-rotational tabs are configured to engage respective ones of the second slots when the plate is coupled to the second end of the cylindrical body; and
wherein the cylindrical body is hollow throughout its entire length.

15. A double-edge hole-saw cup, comprising:
a cylindrical body with a first cutting edge formed at a first open end of the body and a second cutting edge formed at a second open end of the body, the first and second cutting edges disposed about a rotational axis of the body, wherein the cylindrical body is hollow through its entire length, wherein the cylindrical body has first slots disposed around the first open end of the body and second slots disposed around the second open end of the body; and
a plate configured to interchangeably couple to the first and second open ends of the body in an orientation perpendicular to the body's rotational axis;
wherein the plate comprises a plurality of anti-rotational tabs that are disposed around the plate's outer circumference and that are configured to engage respective ones of the first slots or second slots when the plate is coupled to the first or second open end of the cylindrical body, respectively, wherein each anti-rotational tab extends laterally outward beyond an outer wall of the plate.

16. The hole-saw cup of claim 15, wherein the plate has lateral slots formed through the plate and lateral grooves formed in a surface of the plate in an orientation transverse to the slots.

17. The hole-saw cup of claim 15, wherein the plate has a rabbeted edge around its outer circumference for receiving the cylindrical body.

18. The hole-saw cup of claim 15, wherein the plate comprises a lip that extends around the plate's outer circumference and that extends laterally outward from the plate's outer wall, wherein an underside of the lip is configured to engage the first or second open end of the cylindrical body when the plate is coupled to the first or second open end of the cylindrical body, respectively.

19. The hole-saw cup of claim 15, wherein the plate is configured to couple to at least one of the first and second open ends of the cylindrical body via set screws that insert into a sidewall of the cylindrical body.

* * * * *